United States Patent Office 3,359,710
Patented Dec. 26, 1967

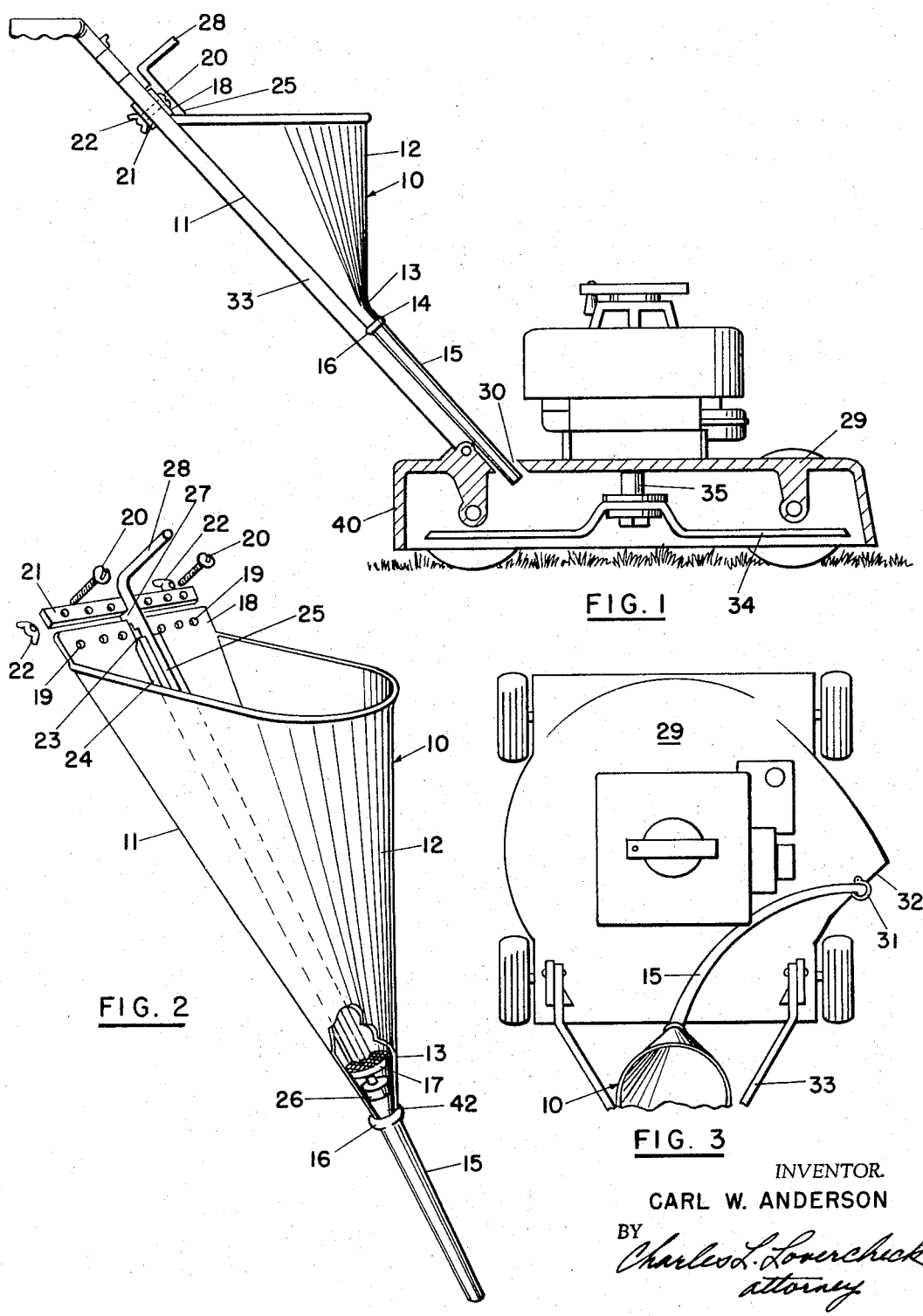

3,359,710
COMBINATION MOWER AND DISPENSER
Carl W. Anderson, 6170 Meridian Drive,
Erie, Pa. 16509
Filed Feb. 8, 1965, Ser. No. 430,909
4 Claims. (Cl. 56—25.4)

ABSTRACT OF THE DISCLOSURE

The invention disclosed herein utilizes a tank or hopper having a flat side and U-shaped wall which is attached to the handle of a rotary lawnmower. The hopper can be used to feed fertilizer into the rotating blades of the rotary lawnmower.

---

This invention relates to a mower and spreader combination and, more particularly, to a combination of rotary mower and spreader for fertilizer, seed, weed killer, and similar materials.

It is an object of the present invention to provide an improved combination mower and spreader which can be operated separately, either as a mower or spreader separately or in combination to perform the mowing and spreading operations simultaneously.

Another object of this invention is to provide a combination mower and spreader which can be readily converted from one type of operation to the other.

Still another object of the invention is to provide a mower and spreader for home use, playgrounds, parks and lawns, agricultural fields, and the like which can be easily handled and manipulated to perform either or both of two operations and which is not appreciably heavy nor larger than separate conventional power mowers and/or spreaders.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is a partial cross sectional view of a mower and spreader according to the invention;

FIG. 2 is an enlarged view partly broken away showing the hopper for supporting the seed or fertilizer; and FIG. 3 is a partial top view showing the mower and spreader combination of another embodiment of the invention.

Now with more particular reference to the drawing, a hopper 10 shown supported on a handle 33 which is attached to a mower housing 29 may be a conventional type of mower familiar to those skilled in the art. The handle 33 is swingably supported on the mower housing 29 which is supported on ground engaging wheels. The engine may be either a gasoline engine or an electric motor, depending upon the power source available. The mower has a rotary blade 34 supported on an engine shaft 35 inside the skirt 40 of mower housing 29. The skirt 40 is supported outside and extends below the path of the blade tip.

The mower housing 29 has a discharge opening 32 at the right hand side through which grass cut by the blade 34 will be discharged in a conventional manner.

The hopper 10 could be made in a number of suitable configurations; however, in the embodiment shown, it has a flat rear wall 11 and a generally U-shaped front surface 12 which converge toward the bottom and define a discharge opening having a screen 17. A stopper 26 is fixed to the rod 25 and the rod 25 has the handle 28 on it. The handle 28 has a feed adjustment detent 27 which can overlie the rear of the upper edge of the attaching flange 18. This feed adjustment detent will hold the stopper 26 away from its seat 42 when it is desired to feed fertilizer or seed through the screen 17 and out of the feeder tube 15. When handle 28 is lifted, feed adjustment detent 27 is moved away from the flange 18 and the stopper 26 can then be pivoted into engagement with the seat 42 by sliding rod 25 downwardly between cleats 14.

The clamp bar 21 is supported at the rear side of the handle 33 and the clamp bar 21 is fixed to the flange 18 by means of bolts 20 which extend through the flange 18 and into the clamp bar 21. The bolts 20 are received in holes 19 and nuts 22 are attached to the bolts 20. The handle 33 which is swingably attached to the mower housing 29 may have a bifurcated handle to support the hopper 10. The handle 33 has a laterally extending hand engaging portion at its top.

The rod 25 is supported between two cleats 24 which may be welded to the flat rear wall 11 and provide a channel for the rod to slide in. When the stopper 26 is in the closed position, the feed adjustment detent 27 will be in engagement with the upper ends 23 of the cleats 24.

The feeder tube 15 is received in the hole 30 in the top surface of the mower housing 29. The feeder tube 15 may be made of flexible material such as rubber, polyethylene, or the like and it may be molded at 16 to receive the tapered end 13 of the hopper. The feeder tube 15 may also be clamped to the mower housing 29 by hose clamp 31 at the discharge opening 32 as shown in the embodiment in FIG. 3.

In operation, the hopper 10 may be filled with fertilizer, seed, or the like and when it is desired to dispense the fertilizer, the handle 28 may be pulled up to remove the stopper 26 from engagement with the seat 42. The vibration of the mower is transmitted through the handle 33 to the hopper 10. This will allow the fertilizer or seed, which is vibrated by the mower, to be discharged into the air stream created by the blade 34. The fertilizer or seed will then be discharged through the discharge opening 32 and will thereby be scattered.

In the embodiment of the invention shown in FIG. 3, the mower may be identical to that shown in FIG. 1. In this embodiment, the feeder tube 15 discharges into the space 32 in the discharge opening of the mower.

The foregoing specification sets forth the invention in its preferred practical forms but it is understood that the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a rotary mower and a fertilizer dispensing device,
    said mower having a housing,
    a handle attached to said housing,
    a rotary blade supported in said housing and its tip rotatable in a circular path,
    means on said housing to rotate said blade in a plane generally parallel to the ground,
    said housing having a top and a skirt extending downwardly around the outside of said path of said blade tip,
    said skirt extending downwardly below said path,
    a discharge opening in one side of said skirt adjacent said path,
    a hopper, said hopper having a rear side resting on and being attached to said handle, and a feeder tube attached at its upper end to the lower part of said hopper, said feeder tube extending downwardly and terminating at its lower end above said path of said blade and toward the center of said blade therefrom.

2. The combination recited in claim 1 wherein:

said hopper is U-shaped in shape, a stopper is supported at the lower end of said U-shaped shape, and a rod is attached to said stopper.

3. In combination, a rotary mower and a fertilizer dispensing device, said mower having a housing, a handle attached to said housing, a rotary blade supported in said housing and its tip rotatable in a circular path, means on said housing to rotate said blade in a plane generally parallel to the ground, said housing having a top and a skirt extending downwardly around the outside of said path of said blade tip.

said skirt exending downwardly below said path, a discharge opening in one side of said skirt adjacent said path, a hopper, said hopper having a rear side resting on and being attached to said handle, and a feeder tube attached at its upper end to the lower part of said hopper, said feeder tube extending downwardly and terminating at its lower end above said path of said blade and toward the center of said blade therefrom, said hopper is U-shaped in shape, a stopper is supported at the lower end of said U-shaped shape, and a rod is attached to said stopper, said handle is swingably attached to said mower, and said handle is bifurcated and has a hand engaging portion at its top and two spaced parts attached to said housing, said hopper having a flat rear side resting against said handle and fixed to said handle.

4. In combination, a rotary mower and a fertilizer dispensing device, said mower having a housing, a handle attached to said housing, a rotary blade supported in said housing and its tip rotatable in a circular path, means on said housing to rotate said blade in a plane generally parallel to the ground, said housing having a top and a skirt extending downwardly around the outside of said path of said blade tip, said skirt extending downwardly below said path, a discharge opening in one side of said skirt adjacent said path, a hopper, said hopper having a rear side resting on and being attached to said handle, and a feeder tube attached at its upper end to the lower part of said hopper, said feeder tube extending downwardly and terminating at its lower end above said path of said blade and toward the center of said blade therefrom, said stopper has a rod attached thereto, and means on said hopper cooperating with said rod to selectively hold said stopper in spaced position from the bottom of said hopper.

References Cited
UNITED STATES PATENTS

| | | | |
|---|---|---|---|
| 2,861,611 | 11/1958 | Considder | 56—25.4 X |
| 2,966,023 | 12/1960 | Carpenter | 56—25.4 |
| 2,973,615 | 3/1961 | Yaremchuk et al. | 56—25.4 |
| 2,974,963 | 3/1961 | McBride | 275—2 |
| 3,043,482 | 7/1962 | Laughlin | 56—255 X |
| 3,097,467 | 7/1963 | Konrad | 56—25.4 |
| 3,100,371 | 8/1963 | Redmon | 56—25.4 |

ABRAHAM G. STONE, *Primary Examiner.*

RUSSELL R. KINSEY, *Examiner.*